(12) United States Patent
Lewin

(10) Patent No.: US 6,528,558 B2
(45) Date of Patent: Mar. 4, 2003

(54) FLAME RETARDATION OF POLYMERIC COMPOSITIONS

(76) Inventor: Menachem Lewin, 1 Levin Street, Jerusalem (IL)

( * ) Notice: Subject to any disclaimer, the term of this patent is extended or adjusted under 35 U.S.C. 154(b) by 0 days.

(21) Appl. No.: 09/909,268

(22) Filed: Jul. 19, 2001

(65) Prior Publication Data

US 2002/0013393 A1 Jan. 31, 2002

Related U.S. Application Data

(63) Continuation of application No. 09/366,399, filed on Aug. 3, 1999, now abandoned.

(51) Int. Cl.⁷ .................. C08K 5/3492; C08K 3/30; C08K 3/32; C08K 3/20; C08K 5/435
(52) U.S. Cl. .................. 524/100; 524/405; 524/413; 524/415; 524/419; 524/420; 524/416; 524/436; 524/437; 524/494
(58) Field of Search .................. 524/413, 415, 524/405, 100, 420, 80, 437, 436, 419, 494, 416

(56) References Cited

U.S. PATENT DOCUMENTS

| | | | | | |
|---|---|---|---|---|---|
| 2,935,471 | A | * | 5/1960 | Aarons et al. | 524/405 |
| 3,931,081 | A | * | 1/1976 | Dawy et al. | 524/423 |
| 4,028,297 | A | * | 6/1977 | Webb | 260/45.7 |
| 4,100,130 | A | * | 7/1978 | Freitag | 260/45.7 |
| 4,408,005 | A | * | 10/1983 | Byrne | 524/421 |
| 4,455,396 | A | * | 6/1984 | Al-Tabaqchall et al. | 524/159 |
| 4,740,527 | A | * | 4/1988 | von Bonin | 521/906 |
| 4,853,424 | A | * | 8/1989 | Staendeke et al. | 524/416 |
| 5,424,344 | A | * | 6/1995 | Lewin | 524/157 |
| 5,466,741 | A | * | 11/1995 | Bonin et al. | 524/405 |
| 5,618,865 | A | * | 4/1997 | Martens | 524/100 |
| 5,693,700 | A | * | 12/1997 | Venkataramani et al. | 524/80 |
| 5,795,930 | A | * | 8/1998 | Fukumura et al. | 524/100 |
| 5,811,470 | A | * | 9/1998 | Prindle et al. | 524/80 |
| 6,031,032 | A | * | 2/2000 | Haracek et al. | 524/100 |
| 6,096,812 | A | * | 8/2000 | Hanefin et al. | 524/100 |
| 6,225,383 | B1 | * | 5/2001 | Hirono et al. | 524/100 |

* cited by examiner

Primary Examiner—Peter Szekely
(74) Attorney, Agent, or Firm—Sidley Austin Brown & Wood, LLP

(57) ABSTRACT

Compositions are disclosed for the flame retardation of polymeric compositions including fillers such as glass fibers. The compositions contain a flame retarding effective additive of at least one polyphosphate, a sulfur containing compound, catalyst and a nitrogen containing compound such as melamine.

1 Claim, No Drawings

FLAME RETARDATION OF POLYMERIC COMPOSITIONS

CROSS REFERENCE TO PRIOR APPLICATION

This is a continuation of Ser. No. 09/366,399 filed Aug. 3, 1999, now abandoned.

FIELD OF INVENTION

The present invention relates to the flame retardation of polymeric compositions and especially compositions including fillers such as glass fibers, and, contrary to prior art teachings, without the use of red phosphorus and of halogen-based additives. This application correspond to Disclosure Document 457665 of Jun. 14, 1999.

BACKGROUND INFORMATION AND PRIOR ART

Flame retardation of polymers is at present mandatory for many of their application in many countries due to strict laws and regulations. Of particular importance are the requirements of polymeric devices, used in electrical, electronic and communication systems, which in many cases contain sizable amounts of glass fibers and other fillers. Accordingly, a number of systems for flame retarding various polymers were developed. These flame-retarding systems usually involve mixing or blending of the plastics with one or more flame retarding chemical additives. Most of these chemicals are either based on halogens or on red phosphorus and constitute low molecular weight compounds. They are in many cases applied in conjunction with co-additives or synergists such as antimony trioxide in the case of halogen compounds. The halogen-based additives provide a reasonable protection from fire hazards, however, they suffer from a number of serious inadequacies, which are responsible for difficulties in their application and use; they generate upon combustion highly-corrosive hydrogen halides and toxic substances. Red phosphorus which is used for glass-fiber containing polyamides can cause the emission of the undesirable toxic phosphine gas.

An important development in flame retardancy employed the principle of intumescence. According to this principle, the flame retardant additives form during the first stages of pyrolysis and combustion a foamed porous barrier which is impermeable to the combustible gases evolved during pyrolysis and to the molten polymer and prevents their flow to the flaming surface. In addition, it is believed that the intumescent barrier hinders the convection of the heat generated in the combustion from entering into the plastic. The additives used in the intumescent systems comprise a "catalyst", usually ammonium polyphosphate (APP), a char-forming agent, in most cases a polyhydric alcohol such as pentaerythritol and a blowing agent usually a nitrogeneous material, such as melamine, guanidine or urea, which produce non-combustible gases. The APP is assumed to serve as a dehydration catalyst of the polyhydric alcohol and the dehydration is believed to occur via phosphorylation of the hydroxyl groups of the alcohol as well as of the hydroxyl groups formed by oxidation of the methyl groups of the polymer during combustion. Subsequent thermal dephosphorylation produced double bonds and crosslinks, which led to char structure foamed by the evolving gases from the blowing agent.

Whereas the intumescent systems provided a reasonable degree of flame retardance for a number of polymers such as polyethylene and polypropylene, it could not advantageously be applied to compositions containing glass fibers or other fillers. The presence of the glass fibers prevented the formation of the impermeable barrier essential for effective flame retardance. The char-forming additives appear not to be compatible with filler materials.

OBJECT

It is a primary object of the invention to improve on existing flame retardation techniques of polymeric composition.

SUMMARY OF THE INVENTION

It has surprisingly been found, that a high degree of flame retardancy can be imparted to glass fiber-containing polymers by using APP without char-forming agents, but with relatively small amounts of metal-based catalysts and of sulfur compounds. These formulations are very effective. It has unexpectedly and surprisingly been found, and this is the most striking feature of this invention, that the addition to an ammonium polyphosphate-based formulation of a relatively small amount of certain sulfur derivatives brings about a dramatic enhancement of the flame retardant effectivity of the system. The additives, according to the present invention, are less toxic and less corrosive than the formulations used in the art of flame retarding of polymers today. They are also readily available and relatively inexpensive.

The invention is applicable to a considerable number of thermoplastic polymers, including, as examples, polyamide (PA) 6 and 66, PA 11, PA 12, PA 4.4, PA 6.3, PA 6.4, PA 6.10, PA 6.12; polybutylene terephtalate (PBT); Polyethylene terephtalate (PET) and other polyesters saturated and unsaturated; polystyrenics; polyacrylics; polyurethanes; polycarbonates polyethylene (PE); Polypropylene (PP) and blends and copolymers of the above, as well as epoxy resins.

The function of the sulfur derivatives in their surprising effect is not exactly understood. It is believed that the effect is based on a specific new quasi-intumescent effect, which produces upon pyrolysis and combustion a non-dripping and non-ignitable surface with a relatively small amount of char. The sulfur derivative appears to be a more effective catalyst for the dehydration, cross-linking and char formation than APP alone. The sulfation and desulfation occur more rapidly than the phosphorylation and dephosphorylation. The char is formed both by the sulfation and the phosphorylation routes, but the char obtained appears to be a more effective, more compact and less penetrable surface barrier. The sulfur compounds may act as synergists of the APP, similar to the effect of antimony trioxide in the case of halogen-based additives.

The sulfur compounds applicable in the present invention are numerous and diversified. The common feature of all sulfur-based materials of this invention is their ability to interact at the pyrolysis and ignition temperatures, i.e., 350–500° C., with the other ingredients of the system i.e. the polymer, APP, glass fibers, and others. They should be stable enough at the processing temperatures, so as not to degrade markedly the polymer, but should react and produce the desirable effect of flame retardancy during combustion. Since the reactivity of various polymers at the high combustion temperatures differs, it is necessary to adapt to given polymeric substrates suitable sulfur derivatives.

The sulfur derivatives used in the present invention include inorganic and organic compounds of several valencies, such as: −2; 0; +4; +6. The minus two valency compounds are predominantly metallic sulfides, particularly of low water solubility and difficult to hydrolyze and in particular of heavy metals such as: $ZnS_1$, $GeS_2$, $MoS_2$, $MnS$, $Sb_2S_3$, $Sb_2S_5$, and other heavy metal sulfides as described, for example, in Fritz Ephraim Inorganic Chemistry, fourth edition, page 229. Although many heavy metal sulfides may be objectionable for use as additives, in several cases due to toxicity (e.g. lead sulfide), and in other cases due to their dark color (Cu, Mo, Ni, Co, Ag), they could advantageously be used in the present invention. Of particular importance is ZnS due to its white color, high temperature stability, low cost and the fact that it is being used as a pigment additive to plastics to impart a white color. ZnS is thus known to be compatible with polymers. It has surprisingly been found that already small amounts of ZnS, in the range of 1–3 weight % of a polymer composition, yield a pronounced flame retardancy effect. At the combustion temperature, in the presence of air, the zinc sulfide is oxidized to higher valency products such as sulfur, zinc sulfoxylate, $ZnSO_2$, thiosulfates, sulfites and finally sulfates. These oxidation reactions, which usually do not produce hydrogen sulfide, are rapid at the ignition temperature, but the oxidation products, which are more reactive than the sulfide, interact with the polymer and the other ingredients of the plastic composition to render the flame-retarding surface barrier.

It has surprisingly been ascertained that when applying sulfur compounds of the valencies between 6 and −2, high degrees of flame retardancy can also be obtained. The present invention thus encompasses such compounds as elementary sulfur, sulfites and thiosulfates and mixtures of these materials themselves or with sulfides. The reactivity of these materials which are considered as steps in the oxidation of sulfides is naturally higher than of the stable sulfides. Undesirable effects such as degradation, and unpleasant odors may thus occur, depending on the polymer and on the condition of the processing. It is evident however, that for those skilled in the art, appropriate conditions for the application of these compounds to suitable polymers, will be readily chosen.

U.S. Pat. No. 5,424,344 describes the use of oxygenated hexavalent sulphur derivatives, together with char-forming agents, for flame retarding polyamides. Whereas good flame retardancy is obtained with the formulation in that patent, relatively large quantities of additives are needed for this effect especially in glass fiber-containing polyamides. In addition, the mechanical properties are impaired. The same oxygenated hexavalent sulfur derivatives can also be used in the present invention, but together with APP. These oxygenated hexavalent sulfur derivatives for the purposes of this invention can include inorganic and organic derivatives of sulfuric and sulfamic acids. Among these materials are ammonium and metal salts of sulfamic acid, condensation products of sulfamic acid, such as imidobisulfonic acid, $NH(SO_3H)_2$, and their salts, such as mono- and diammonium salts, alkali metal and alkaline earth salts, and other divalent and multivalent salts. The hydrogen atoms in the sulfamates can also be substituted by aliphatic, aromatic and cyclic derivatives. The invention also includes sulfamide, $NH_2SO_2NH_2NH(NH_2SO_2)_2$ and aliphatic and aromatic substituents of sulfamide, $R_1R_2NSO_2NR_3R_1$. The substituents in all the above cases can be different aromatic and aliphatic groups, which can be advantageously $C_{1-6}$-alkyl, phenyl or naphtyl, each optionally substituted by any halogen-free moiety. The invention also includes cyclic sulfamides and sulfimides.

The amounts of the sulfur-containing additive (a) to be used in the present invention depend on the polymer and the amount of the glass fibers or other fillers, as well as on the nature of the sulfur compound applied, and varies from 0.01% to 15.0%. When using ammonium sulfamate a different quantity is needed than, for example, in the cases of elementary sulfur, sodium sulfite or zinc sulfide.

The amounts of APP-additive (b) needed according to the invention may vary between 10 to 40 weight % of the overall composition, depending on the other ingredients present and especially on the amount of the glass fibers or other fillers added.

As will be seen in the examples below a certain degree of flame retardancy is obtained according to the present invention with APP also without the sulfur derivative, and especially in the presence of additional materials, such as metal-based catalytic compounds. The amount of APP needed for a significant effect is not significantly different from the amount used in the presence of the sulfur derivatives. The flame retardant effect of the APP with the catalyst expresses itself in an increase in the oxygen index (OI) and in the absence of flaming drips, but the rating according to the UL94 standard is low.

Ammonium polyphosphate is not the only salt of polyphosphoric acid which can be used in this invention. A part of the APP can be replaced by melamine polyphosphate, the amount depending upon the polymer processed and the sulfur derivative used. APP can also be partly replaced by melamine and its condensation products, such as melam and melem and to a small extent, also by the catalyst.

Another important feature of the present invention is the addition of metal-based catalysts (C). These compounds comprise oxides and salts of alkali, alkaline earth, divalent and multivalent metals. One or a mixture of several such compounds may be used together in the invention, depending on the nature of the polymeric system and according to the function required. Examples of preferred catalysts are zinc borate, zinc oxide, magnesium oxide, vanadium pentoxide, aluminum trioxide and manganese oxide. The catalytic effect expresses itself in an increase in the OI values as well as in an increased UL94 rating. The amounts of catalyst (C) needed for the performance of the present invention are in the range of 0.0–20 weight %. The needed amounts of catalyst additive (C) may vary from compound to compound depending on the nature of the metalic element as well as of the anionic part of the salt. A feature of the present invention is that the effectivity of the additive (C) varies with the percentage added. For each catalyst there is an optimum concentration or concentration range, with maximum effect, above and below which the catalytic effect is diminished or disappears.

The functions of the metal compound catalyst are not unequivocally defined. There are several possible functions:

A. The additive acts as a pH regulator in the processing, storage, recycling and combustion. The additives (a) and (b) may release some strong acid traces and lower the pH of the material. This may lead to an excessive degradation of the polymer and to a deterioration of its physical properties. Whereas a limited degree of degradation is needed during the pyrolysis and combustion in order to facilitate the dehydration and the cross-linking, excessive degradation during processing is detrimental. The identity of (c) and its concentration are most important and have to be strictly regulated. It has been discovered that a similar buffering effect can be obtained by the controlled addition of a basic nitrogen derivative, such as melamine-additive (d), to replace (c) or in addition to it. This is already described in U.S. Pat. No. 5,424,344, in which melamine is a buffer in the process of treating polyamides with sulfamates.

B. Another function of additive (C) is as cross-linking catalyst. Many metallic compounds are known as cross-linking catalysts, as described by Harro Petersen in Handbook of Fiber Science and Technology, Vol. 11, Part A, Chemical Processing of Fibers and Fabrics, M. Lewin and S. B. Sello, Editors, Marcel Dekker Publishers, pages 205–210 (1983). The cross-linking can take place between 2 or more APP chains by the formation of bridges between them with the divalent or multivalent catalyst molecules. These bridges can be formed during processing or preferably during pyrolysis and combustion. Such bridges stabilize the APP and decrease its volatility during pyrolysis and combustion. It will increase the effective available concentration of the phosphorus and the stability of the char in which the APP participates. If the concentration is too low the effect is not noticeable and enhancement in flame retardant effectivity will be noticed. If, on the other hand, the concentration is too high, the APP will become highly cross-linked and inactive and the effectivity will decrease.

C. Another function of the catalyst additive (c) is the stabilization of the char. The integrity and mechanical strength of the char contribute greatly to flame retardancy. Low melting glasses, such as zinc borate have been used as flame-retardant and smoke-suppressing additives in conjunction with halogen for polyvinyl chloride [See R.E. Meyers et al., J. fire Sci. 3, 415–431, (1986)].

The fillers-additive (e) in the polymer mixtures according to the present invention may consist of uncrushed glass fibers of varying thickness and length, which may be coated or uncoated; mineral fibers, carbon fibers, aramide fibers, gypsum, wollastonite, lignin-containing fibers, etc. They may also include pigments, lubricants, mold-release agents, flow-enhancing agents, temperature—stabilizing agents, impact modifiers and electro-conductive agents.

Other flame-retardant agents, such as halogen-containing additives, can be added to the composition and add some flame-retardant effect, if needed, to it. It is emphasized, however, that a most important advantage of the present invention is that no halogens and red phosphorus additives are needed to achieve high levels of flame retardancy as expressed by high OI and UL94 ratings.

The mixing and blending of the ingredients of the present invention can be carried out by any method suitable for obtaining uniform dispersions of particular solids such as mixing in the Brabender mixer or in an extruder or compounder.

The invention will now be described by several examples, it being understood that these examples are given by way of illustration and not limitation and that many changes may be effected without affecting the scope and spirit of the invention. The examples are summarized in the following Table 1.

TABLE 1

Polyamide 6

| Ex. No. | (a) wt. % | (b) wt. % | (c) wt. % | (d) wt. % | (e) wt. % | OI | UL-94 | Drips | Burn time, av. s. |
|---|---|---|---|---|---|---|---|---|---|
| 1 | | | | | GF;25 | 25 | NC | Y | BC |
| 2 | | 20 | | | GF;25 | 29 | NC | Y | BC |
| 3 | | 22 | ZnB-3.0 | | GF;25 | 32 | V2 | ND | 12 |
| 4 | | 20 | | Me;2.5 | GF;30 | 36.8 | NC | Y | BC |
| 5 | | 20 | | Melam;3 | GF;30 | 34.3 | NC | Y | BC |
| 6 | | 20 | ZnB-1.5 | Melam;2.5 | GF;30 | 37.5 | V2 | ND | 8.4 |
| 7 | | 22 | | Me;5.0 | GF;25 | 32 | V0 | ND | 0.0 |
| 8 | AS;1 | 20 | ZnB-1.5 | Me;1.04 | GF;30 | 41.3 | V0 | ND | 0.4 |
| 9 | Me Sulfamate - 1.96 | 20 | ZnB-1.5 | | GF;30 | 42.5 | VO | ND | 0.2 |
| 10 | AS;1 | 20 | ZnB-1.5 ZnO-1 | | GF;30 | 42.9 | VO | ND | 0.2 |
| 11 | AS;1 | 21 | ZnO-2.5 | | GF;25 | 37.0 | VO | ND | 0.0 |
| 12 | AS;1 | 21 | Al$_2$O$_3$-1.5 | | GF;30 | 41.8 | VO | ND | 2.0 |
| 13 | AS;1 | 21 | Al$_2$O$_3$-2.5 | | GF;30 | 42.4 | VO | ND | 0.6 |
| 14 | AS;1 | 21 | Al$_2$O$_3$-3.0 | | GF;30 | 26.3 | NC | ND | BC |
| 15 | AS;0.5 | 22 | ZnB-3.0 | | GF;25 | 38 | V0 | ND | 1.5 |
| 16 | S;0.4 | 20 | ZnB-1.5 ZnO-1.0 | | GF;30 | 36.1 | V0 | ND | 0.0 |
| 17 | Na$_2$SO$_3$-1.5 | 21 | ZnB-2.5 | | GF;30 | 37.2 | V1 | ND | 7.0 |
| 18 | Methyl ammonium sulfamate; 1.1 | 20 | ZnB-1.5 ZnO-1.0 | | GF;30 | 38.5 | V1 | ND | 16.7 |
| 19 | ZnS;3.0 | 22 | | | GF;25 | 35 | VO | ND | 4.0 |
| 20 | ZnS;2.0 | 20 | | Me;2.5 | GF;30 | 41 | NC | Y | BC |
| 21 | ZnS;2.5 | 20 | ZnB;1.5 | | GF;30 | 38.9 | VO | ND | 2.7 |
| 22 | ZnS;2 | 20 | ZnB-1.5 ZnMo-0.2 | Me-2.5 | GF;30 | 37.3 | VO | ND | 0.7 |
| 23 | ZnS;2.5 | 20 | ZnB-1.5 | Me-3.5 | GF;25 | | VO | ND | 0.7 |
| 24 | ZnS;2.0 | 20 | ZnB-1.5 | Me-3.0 | GF;25 | | VO | ND | 1.8 |
| 25 | ZnS;2.0 | APP-18; MPP-4 | ZnB-1.5 | Me-2.5 | GF;25 | | VO | ND | 1.8 |
| 26 | ZnS;2.0 | APP-10; MPP-10 | ZnB-1.5 | Me-2.5 | GF;30 | | V1 | ND | 12.0 |
| 27 | BSAM-2 | 21 | ZnB-2.5 | | GF;30 | 39.3 | NC | Y | BC |
| 28-PA66 | ZnS-2 | 20 | ZnB-1.5 | Me-2.5 | GF;30 | | VO | ND | 4.7 |
| 29-PA66 | ZnS-2 | 22 | ZnB-1.5 | Me-2.5 | GF;30 | | V1 | ND | 7 |
| 30-PBT | | | | | GF;30 | 26.7 | NC | Y | BC |
| 31-PBT | | 20 | | | GF;30 | 33.2 | NC | Y | BC |
| 32-PBT | Na$_2$SO$_3$-1.5 | 22 | ZnB-1.5 | Me-2.5 | GF;30 | 32.8 | V2 | 0–1 | 5.2 |

TABLE 1-continued

Polyamide 6

| Ex. No. | (a) wt. % | (b) wt. % | (c) wt. % | (d) wt. % | (e) wt. % | OI | UL-94 | Drips | Burn time, av. s. |
|---|---|---|---|---|---|---|---|---|---|
| 33-PET | | | | | GF;30 | 24 | NC | Y | BC |
| 34-PET | | 20 | | | GF;30 | 35.1 | V2 | 0–1 | 9.1 |
| 35-PET | AS-1.0 | 20 | ZnB-1.5 | Me2.5 | GF;30 | 34.2 | VO | ND | 1.0 |
| 36-PET | ZnS-2.0 | 22 | ZnB-1.5 | | GF;30 | 35 | VO | ND | 1.3 |
| 37-PET | S-0.4 | 20 | ZnB-1.5 | Me-2.5 | GF;30 | 35.9 | VO | ND | 2.8 |
| 38-PET | $Na_2SO_3$-1.5 | 22 | ZnB-1.5 | Me-2.5 | GF;30 | 38.3 | VO | ND | 1.2 |
| 39-PET | $Na_2SO_3$-1.0 | 20 | ZnB-1.5 | Me-2.5 | GF;30 | 35.2 | V0 | ND | 2.4 |

Notes to Tables
1. Polymers were used in the form of pellets, and provided as follows: PA-6 and PA-66- DuPont and DSM; PBT-Ticona; PET—Eastman Chemical
2. GF—glass fibers for Polyamide examples; Owen Corning 0002626 CS 173X 10C.
3. APP, ammonium Polyphosphate: in examples 1–17, and 22-PHOC-CHEK P/30, Monsanto. For other examples—Hostaflam AP422, Clariant.
4. MPP, melamine polyphosphate, Melapur 200, DSM melapur.
5. AS, ammonium Sulfamate, Aldrich
6. Melamine sulfamate prepared from sulfamic acid (Aldrich) and melamine by heating a 1:1 molar mixture.
7. ZnS, zinc sulfide, Sachtolith HD-S, 98% pure, Sachtleben Chemie GMBH.
8. ZnB-zinc borate, Firebrake 415, US Borax corp.
9. ZnO, zinc oxide, AZO 66 US Zinc Co.
10. Me, melamine, 99.8 pure, DSM Melapur
11. MELAM, 98% pure, DSM Melapur
12. $Al_2O_3$, MICROLUX R, a. Miller Co.
13. S (sulfur), precipitated sulfur powder Fisher Scientific Co.
14. Methylammonium sulfamate, $CH_3NHSO_3NH_4$, prepared by mixing methylsulfonic acid with ammonia (1:1 moles)
15. $Na_2SO_3$ (Sodium sulfite), pure, Aldrich.
16. BSAM, benzenesulfonamide, Aldrich.
17. $Na_2S_2O_3$ (sodium thiosulfate), Aldrich.
18. ZnMo (zinc molybdate), Molly White 151, Sherwin Williams Chemical Co.
19. DIBS (Diammonium imidobisulfonate, prepared as described in U.S. Pat. No. 5,424,344)
20. The UL94 ratings are based on measurements on 1/16" bars.

The most striking and unexpected results of this invention center on the synergistic interaction of the phosphorus derivative APP and sulfur compounds of several valencies, which is disclosed for the first time in this patent application. Highly striking is also the significant effect of APP without sulfur derivatives and preferably in the presence of small amounts of metallic catalysts and nitrogen derivatives, which was not known until now as an effective flame retardant for glass fiber reinforced polymers.

It is needed to blend the (e)-containing polymer with (b), or with (b) and (c), or with (b) and (a) and (c), or (b) and (a) and (c) and (d), or (b) and (a) and (d), or with (b) and (c) and (d), or with (b) and (d), depending on the polymer mixture and on the degree of flame retardancy required. While a few examplary embodiments of this invention have been described in detail, those skilled in the art will recognize that there are many possible variations and modifications; many novel and advantageous features of the invention can be formed. Accordingly, it is intended that the following claims cover all such modifications and variations:

What is claimed:
1. A flame retardant composition comprising at least 20% by weight of a thermoplastic polymer, having incorporated therein an amount of filler or reinforcing agent (e) not exceeding about 40% by weight of the composition and a flame retardant effective amount of the following four additives, (b), (a), (c), and (d), in the following weight percentages calculated on the weight of the composition selected from the group consisting of
(b) ammonium polyphosphate, melamine polyphosphate and their mixtures, in the range of 10–40% of the total weight of the composition, at least a portion of (b) being ammonium polyphosphate,
(a) a sulfur containing material comprising about 0.1–1% of elemental sulfur or mixtures of at least two sulfur containing materials with a sulfur content in the range of about 0.1–1.0% of the total weight of the composition said sulfur containing materials being members of the group consisting of elemental sulfur, sulfamic acid, imnidobisulfonic acid, mono diammonium as well as monovalent, divalent and multivalent metal salts of sulfamic acid and imidobisulfonic acid, sulfamide, sulfimide, and their inorganic substituents and mixtures, sulfurous acid and its monovalent, divalent and multivalent metal salts as well as its organic derivatives and sulfides of monovalent, divalent and multivalent metals,
(c) a catalyst selected from the group of oxides and salts of monovalent, Idivalent and multivalent metals in amounts of 0.5–5% of the total weight of the composition and
(d) a nitrogen-containing compound selected from the group consisting of melamine, its condensation products melem, melam and melone, guanidine, urea and their methylol derivatives and alkylene diamine in amounts of 0.5–6% of the total weight of the composition,
further provided that the following ratio's of the percentage weights of the ingredients in the composition are adhered to:
polymer/(b)=1.0–6.0;
polymer/(a)=600–40;
(b)/(a)=400–10;
(b)/(c)=80–2.0;
(b)/(d)=80–1.6.

* * * * *